United States Patent
Bracegirdle et al.

(10) Patent No.: US 10,494,497 B2
(45) Date of Patent: *Dec. 3, 2019

(54) PROCESSES FOR PREPARING FOAM COMPOSITES

(71) Applicant: XFLAM PTY LTD, South Melbourne (AU)

(72) Inventors: Wren Bracegirdle, South Melbourne (AU); Michael Monti, South Melbourne (AU); Gordon Smyth, South Melbourne (AU); Stephen Clarke, South Melbourne (AU); Stephen McMillan, South Melbourne (AU); Julian Glynn, South Melbourne (AU); Murray Orpin, Herefordshire (GB)

(73) Assignee: XFLAM PTY LTD, South Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,807

(22) Filed: Aug. 20, 2018

(65) Prior Publication Data

US 2018/0355137 A1    Dec. 13, 2018

Related U.S. Application Data

(63) Continuation of application No. 14/934,017, filed on Nov. 5, 2015, now Pat. No. 10,077,348, which is a continuation of application No. PCT/AU2014/050028, filed on May 7, 2014.

(30) Foreign Application Priority Data

May 7, 2013  (AU) ................ 2013901616

(51) Int. Cl.
| | |
|---|---|
| *C08J 9/232* | (2006.01) |
| *C08J 9/35* | (2006.01) |
| *C08J 9/00* | (2006.01) |
| *C08J 9/32* | (2006.01) |
| *B29C 44/04* | (2006.01) |
| *B29C 44/44* | (2006.01) |
| *B29C 44/20* | (2006.01) |
| *C08J 9/236* | (2006.01) |
| *C08L 61/06* | (2006.01) |
| *C08L 25/06* | (2006.01) |
| *B29K 25/00* | (2006.01) |
| *B29L 7/00* | (2006.01) |

(52) U.S. Cl.
CPC ........... *C08J 9/0061* (2013.01); *B29C 44/04* (2013.01); *B29C 44/206* (2013.01); *B29C 44/445* (2013.01); *C08J 9/009* (2013.01); *C08J 9/0066* (2013.01); *C08J 9/232* (2013.01); *C08J 9/236* (2013.01); *C08J 9/32* (2013.01); *C08J 9/35* (2013.01); *C08L 25/06* (2013.01); *C08L 61/06* (2013.01); *B29K 2025/06* (2013.01); *B29L 2007/002* (2013.01); *C08J 2203/22* (2013.01); *C08J 2325/06* (2013.01); *C08J 2361/10* (2013.01); *C08J 2425/06* (2013.01); *C08J 2461/10* (2013.01)

(58) Field of Classification Search
CPC ..... B29C 44/04; B29C 44/206; B29C 44/445; C08J 9/0061; C08J 9/0066; C08J 9/009; C08J 9/232; C08J 9/236; C08J 9/32; C08J 9/35; C08J 2203/22; C08J 2325/06; C08J 2361/10; C08J 2425/06; C08J 2461/10; C08L 25/06; C08L 61/06; B29K 2025/06; B29L 2007/002
See application file for complete search history.

(56) References Cited

U.S. PATENT DOCUMENTS

| | | | |
|---|---|---|---|
| 3,842,020 A | 10/1974 | Garrett | |
| 4,596,682 A | 6/1986 | Mosier | |
| 4,800,103 A | 1/1989 | Jeffs | |
| 4,964,936 A | 10/1990 | Ferro | |
| 5,194,458 A | 3/1993 | Tarquini | |
| 5,756,599 A | 5/1998 | Teodorczyk | |
| 6,332,943 B1 | 12/2001 | Herrmann | |
| 10,077,348 B2 * | 9/2018 | Bracegirdle | ........... C08J 9/0061 |
| 2004/0102534 A1 | 5/2004 | Orpin | |
| 2007/0142485 A1 | 6/2007 | Nordin et al. | |
| 2009/0030099 A1 | 1/2009 | Chino et al. | |
| 2012/0225963 A1 | 9/2012 | Duin | |
| 2016/0053065 A1 | 2/2016 | Bracegirdle et al. | |

FOREIGN PATENT DOCUMENTS

| | | |
|---|---|---|
| EP | 0559254 A1 | 9/1993 |
| EP | 1420042 A1 | 5/2004 |
| GB | 2362586 B | 11/2003 |

(Continued)

OTHER PUBLICATIONS

International Search Report; PCT/AU2014/050029; dated Jun. 18, 2014.
International Search Report; PCT/AU2014/050028; dated Jun. 24, 2014.
Examiner Fukui-Japanese Patent Office; Notice of Reasons for Rejection Pat. Appl. No. P2016-512171; dated Oct. 31, 2017.

(Continued)

*Primary Examiner* — Irina S Zemel
(74) *Attorney, Agent, or Firm* — Kilpatrick Townsend & Stockton LLP

(57) ABSTRACT

Processes for preparing polystyrene-phenolic foam composites and precursor compositions are described. The processes yield composites having advantageous properties particularly useful in insulation and fire resisting applications.

16 Claims, No Drawings

(56) References Cited

FOREIGN PATENT DOCUMENTS

| | | |
|---|---|---|
| JP | 10-329297 | 12/1998 |
| JP | 2002-535430 | 10/2002 |
| JP | 2011-84748 | 4/2011 |
| RU | 2186799 C2 | 8/2002 |
| WO | 1998/54004 | 12/1998 |
| WO | 2000/43446 | 7/2000 |
| WO | 2006/043435 | 4/2006 |
| WO | 2006/090687 A1 | 8/2006 |

OTHER PUBLICATIONS

Russian Patent Application No. 2015152145(080378), English translation of Official Action mailed by the Russian Federal Service for Intellectual Property dated Mar. 28, 2018, 5 pages.
Russian Patent Application No. 2015152145(080378), English translation of Search Report mailed by the Russian Ferderal Service for Intellectual Property dated Mar. 28, 2018, 2 pages.
U.S. Appl. No. 14/934,017, Advisory Action,, dated Apr. 25, 2018, 3 pages.
U.S. Appl. No. 14/934,017, "Notice of Allowance," dated May 18, 2018, 5 pages.

\* cited by examiner

PROCESSES FOR PREPARING FOAM COMPOSITES

CROSS-REFERENCE TO RELATED APPLICATIONS

The present application is a continuation of U.S. application Ser. No. 14/934,017, filed Nov. 5, 2015, which application is a continuation of PCT/AU2014/050028, filed May 7, 2014, which application claims priority to AU 2013 901616, filed May 7, 2013, all of which are hereby incorporated by reference in their entireties for all purposes.

FIELD

The present disclosure relates to processes for preparing polystyrene-phenolic foam composites and precursor compositions. The processes yield composites having advantageous properties particularly, although not exclusively, useful in insulation and fire resisting applications.

BACKGROUND

Polystyrene foam slabs or forms are widely used for thermal and acoustic insulation in building construction. The conventional process for the production of a polystyrene foam slab or form is as follows:

1. Expandable polystyrene is supplied from the manufacturer in particulate form graded for particle size. This particulate polystyrene has a proportion of blowing agent such as pentane dissolved in it.
2. The particles are exposed to heat, usually by steam, in a fluidised bed. As the particles pass from the bottom of the fluidised bed to the top, they soften and as the pentane is lost from solid solution, the released gas causes the softened polystyrene particles to expand up to fifty times their original volume. The particles become approximately spherical with a very low density. The expanded polystyrene particles are collected at the top of the bed. The particles still contain a small amount of pentane after this primary expansion process.
3. The dry particles are introduced into moulds the walls of which are penetrated by many small apertures. The dry particles may then be compressed. Steam is introduced into the vessel containing the polystyrene particles. The polystyrene particles soften and the residual pentane is released. In this second stage the volume expansion of the charge is contained by the mould walls forcing the particles together and fusing them to form a single, lightweight mass of expanded polystyrene foam.
4. If the mould is in the form of a block, the blocks of expanded polystyrene are subsequently sliced into slabs. These slices may be used as the cores of insulating walls or panels.

A disadvantage of polystyrene foams is their high propensity to burn and/or melt in a fire leading to the loss of structural strength. In contrast, foams with a phenolic resin matrix, that is phenolic foams, as a class of materials, are known for their excellent fire resistance and thermal properties, but their commercial potential in many fields of application is impeded due to their poor structural properties characterised by high brittleness and friability.

It would be desirable to identify new foam products that address the above limitations and further desirable to employ manufacturing processes which utilise commonly employed process equipment such as steam block moulding.

SUMMARY

There is provided a process for preparing a particulate composition comprising the steps of:
a) forming a mixture of expandable thermoplastic microspheres, reactive phenolic resole resin, and expandable polystyrene particles, in the presence of an acidic catalyst; and
b) conditioning the mixture to partially cure the reactive phenolic resole resin.

The process may comprise the steps of:
a) forming a mixture of expandable thermoplastic microspheres and reactive phenolic resole resin, in the presence of an acidic catalyst;
b) combining the mixture formed in a) with expandable polystyrene particles to form a mixture;
c) conditioning the mixture formed in b) to partially cure the reactive phenolic resole resin.

There is also provided a process for preparing a particulate composition comprising the steps of:
a) forming a mixture of expandable thermoplastic microspheres, reactive phenolic resole resin, and expandable polystyrene particles, in the presence of an acidic catalyst; and
b) conditioning the mixture;
wherein the particulate composition has a water content of less than 10% by weight based on the total weight of the composition and water.

There is also provided a process for preparing a particulate composition comprising the steps of:
a) forming a mixture of expandable thermoplastic microspheres and reactive phenolic resole resin, in the presence of an acidic catalyst;
b) combining the mixture formed in a) with expandable polystyrene particles to form a mixture;
c) conditioning the mixture formed in b);
wherein the particulate composition has a water content of less than 10% by weight based on the total weight of the composition and water.

The particulate composition may comprise both a partially cured phenolic resole resin and a water content of less than 10% by weight based on the total weight of the composition and water.

In any of the aforementioned processes subsequent to combining the phenolic resole resin with acidic catalysts the resulting mixture may be combined with expandable polystyrene particles within 30 minutes, when said mixture is at a temperature of 20° C., or the mixture may be combined with expandable polystyrene particles within 15 minutes, when said mixture is at a temperature of 20° C., or the mixture may be combined with expandable polystyrene particles within 10 minutes, when said mixture is at a temperature of 20° C.

The herein disclosed processes yield particulate compositions having excellent handling qualities. The compositions have advantageously high flowability, enabling ease of transfer and manipulation of the particles during manufacturing operations.

The term partially cured as used herein means that the phenolic resole resin may not have been subjected to temperatures above 80° C., or not above 70° C., or the phenolic resole resin may not have been subjected to temperatures above 80° C., or not above 70° C., for more than 1 hour, or the phenolic resole resin may not have been subjected to temperatures above 80° C., or not above 70° C., for more than 0.5 hour.

At least one of the constituents of the particulate compositions may be provided in the form of an aqueous solution, dispersion or suspension. During the process of conditioning, some of the water may be removed from the composition, with the result that the particulate composition becomes substantially dry so that it is free flowing and easily transferable. As used in this context the term 'substantially' means that the particulate composition contains less than 10% by weight water based on the total weight of the composition and water, or less than 7% by weight water, or less than 5% by weight water, or less than 3% by weight water, or less than 1% by weight water, or 0% water.

The processes disclosed herein may yield a partially cured phenolic resole resin that is substantially insoluble in water.

The processes disclosed herein may comprise the optional step of combining a filler with one or more of the expandable thermoplastic microspheres, reactive phenolic resole resin or expandable polystyrene particles or mixtures thereof prior to conditioning. The filler may be added to the expandable thermoplastic microspheres. A range of fillers is available. One or more fillers may be used depending on the characteristics required of the end product. Suitable, non limiting fillers include particulate silica, talc, kaolin, clay and titanium dioxide, glass fibre, nanocomposites or nanoparticles. Inorganic compounds, for example particulate inorganic compounds, may be utilised. The filler may be present in amounts of 0.5-60% by weight, or 1-20% by weight, or 2-15% by weight based on the total weight of the particulate composition. The properties of the filler may be suitably modified by treatment with one or more agents, for example to modify the surface properties of the filler. Such treatment may, for example, reduce the solubility of soluble fillers in a liquid, particularly an aqueous liquid. The selection of the modifying agent(s) will depend on the desired characteristics of the filler. One class of modifying agents includes silanes.

The filler may have a particle size between 0.1 mm and 5 mm or the particle size may be between 0.5 mm and 2 mm. The particulate filler may be granular boric acid. The particle size of the granular boric acid may be about 1 mm. The granular boric acid may be treated with a silane to yield a silane coated granular boric acid. The silane may serve to reduce the water solubility of the boric acid.

The thermoplastic microspheres may be combined with the expandable polystyrene particles and the phenolic resole resin, optionally in the presence of filler, and the resulting mixture treated with acidic catalyst.
The thermoplastic microspheres may first be treated with acidic catalyst and the resulting mixture combined with expandable polystyrene particles and phenolic resole resin. Filler may then be added to the resulting mixture. Alternatively, filler may be added at the same time as the thermoplastic microspheres, expandable polystyrene particles and the phenolic resole resin are being combined.

Other components may be included in the processes disclosed herein to improve particular physical properties of the product or to reduce costs. These may be added to one or more of the expandable polystyrene, the phenolic resole resin or the thermoplastic microspheres or at any stage of mixing these components. For example, fire retardants containing, for example, chlorine, bromine, boron, phosphorous or ammonia, especially ammonium phosphate may be added to improve fire resistance. Expandable graphite may also be usefully employed. The graphite may expand when exposed to high temperatures as would be encountered in a fire.

One or more surfactants may also be included in processes disclosed herein. Suitable surfactants include silicone polyethers, for example silicone glycol copolymers.

Water repellents, such as silicon containing aqueous emulsions may also be added to control or reduce water absorption.

One or more of the constituents of the processes disclosed herein may be treated with other additives and/or modifiers. For example they may be treated with a thermal conductivity modifier such as carbon, particularly an aqueous dispersed carbon. The thermoplastic microspheres may be treated with a thermal conductivity modifier such as carbon, particularly an aqueous dispersed carbon.

There is also provided a process for preparing a particulate composition comprising the steps of:
a) forming a mixture of expandable thermoplastic microspheres and acidic catalyst;
b) combining the mixture formed in a) with reactive phenolic resole resin;
c) combining the mixture formed in b) with expandable polystyrene particles;
d) conditioning the mixture formed in c) to partially cure the reactive phenolic resole resin.

There is also provided a process for preparing a particulate composition comprising the steps of:
a) forming a mixture of expandable thermoplastic microspheres and acidic catalyst;
b) combining the mixture formed in a) with reactive phenolic resole resin;
c) combining the mixture formed in b) with expandable polystyrene particles;
d) conditioning the mixture formed in c);
wherein the particulate composition has a water content of less than 10% by weight based on the total weight of the composition and water.

Optionally, one or more fillers may be added at any one or more of steps a), b) or c). Optionally one or more additives such as surfactants or carbon, optionally in dispersed form, may be added at any one or more of steps a), b) or c).

One or more steps of the processes disclosed herein may be performed in batch or continuous modes.

Expandable Polystyrene Particles

The expandable polystyrene particles may have an average particle size between 0.1 and 5 mm, or an average particle size between 0.5 and 3 mm, or an average particle size between 0.5 and 1.5 mm or an average particle size of between 0.7 and 1.0 mm.

The expandable polystyrene particles may contain at least one blowing agent. The polystyrene blowing agent and technique may comprise the employment of liquid physical blowing agents, the agents which are volatile liquids which produce a blowing gas through vaporisation of the blowing agent or through decomposition of the blowing agent when heated.

Numerous blowing agents suitable for use are well known in the art. The blowing agent may be a liquid having an atmospheric pressure boiling point between −50° and 100° C., or between 0° and 50° C.

Examples of blowing agents include organic compounds such as hydrocarbons, halogenated hydrocarbons, alcohols, ketones and ethers. Specific examples of hydrocarbon blowing agents include propane, butane, pentane, iso-pentane and hexane. Pentane is an exemplary blowing agent.

The amount of blowing agent present in the expandable polystyrene particles may be between 1 and 12% by weight, or between 2 and 10% or between 4 and 8%.

The expandable polystyrene particles may be derived from styrene polymers that are commonly used for preparing polystyrene particles that are to be blown to form polystyrene foam particles. As well as using styrene as the sole monomer other addition polymerisable monomers may be used and such copolymers are embraced by the term polystyrene in this specification. Styrene is always present as the major component of the polystyrene polymer.

The expandable polystyrene particles may be unexpanded or partially expanded polystyrene particles or mixtures thereof. The expandable polystyrene particles may be partially expanded. When partially expanded polystyrene particles are used then their density may be between 5 kg/m$^3$ to 20 kg/m$^3$, or between 7 to 18 kg/m$^3$, or between 9 kg/m$^3$ to 14 kg/m$^3$.

The expandable polystyrene particles may be modified by the addition of one or more additives, such as flame retardants, smoke suppressants, antistatic agents, flowability improvers, foaming modifiers, and other additives commonly found or used in expandable polystyrene particles. For example, the expandable polystyrene particles may be coated or impregnated with carbon or graphite.

Reactive Phenolic Resole Resin

Base-catalysed phenol-formaldehyde resins made with a formaldehyde to phenol ratio of greater than one (usually around 1.5) may be termed resoles. A suitable reactive phenolic resole resin as used herein may have a viscosity of between 500-4,000 cP at a temperature of 25° C., or a viscosity of between 1000-3000 cP at a temperature of 25° C. The reactive phenolic resole resin as used herein may have a water content of 2-7% by weight based on the total weight of the reactive phenolic resole resin and water, or a water content of 3-6% by weight based on the total weight of the reactive phenolic resole resin and water. The reactive phenolic resole resin as used herein may have a free phenol content of less than 25% by weight relative to the total weight of the reactive phenolic resole resin and water, or less than 20% by weight, or less than 18% by weight. The free phenol content may be between 10% and 20% by weight, or may between 14% and 18% by weight. The reactive phenolic resole resin as used herein may have a free formaldehyde content of less than 3% by weight, or a free formaldehyde content of less than 1% by weight relative to the total weight of the reactive phenolic resole resin and water. The reactive phenolic resole resin may have a pH of 7 or less, or a pH of 6.6 or less. The reactive phenolic resole resin may have any one or any combination of the above disclosed features.

Expandable Thermoplastic Microspheres

The expandable thermoplastic microspheres as used herein may have an average particle size from between 1 and 100 microns, or an average particle size from between 2 and 50 microns, or an average particle size from between 5 and 20 microns. The expandable thermoplastic microspheres may be derived from unexpanded or partially expanded microspheres or a mixture thereof, and comprise a thermoplastic polymer shell made of a homopolymer or copolymer. Mixtures of different thermoplastic microspheres may be utilised.

The thermoplastic polymer shell of the thermoplastic microspheres may be derived from monomers selected from the group consisting of acrylonitrile, methacrylonitrile, α-chloroacrylonitrile, α-ethoxyacrylonitrile, fumaroacrylonitrile, crotoacrylonitrile, acrylic esters, methacrylic esters, vinyl chloride, vinylidene chloride, vinylidene dichloride, vinyl pyridine, vinyl esters, and derivatives or mixtures thereof.

The thermoplastic polymer shell may be derived from vinylidene chloride monomer.

The expandable thermoplastic microspheres may contain a propellant encapsulated within the thermoplastic polymer shell. The microspheres may expand by heating above the boiling point of the propellant and above the softening point of the polymer shell.

The propellant may be a volatile liquid trapped within the polymer shell. Suitable propellants include various short chain alkanes and short chain isoalkanes such as, but not limited to, isopentane, isobutane, n-butane, hexane, heptane, isooctane, petroleum ether and pentane or mixtures thereof.

Suitable thermoplastic microspheres may begin to soften in the temperature range 70-100° C., or 85-95° C. Maximum expansion may occur in the temperature range of 100-150° C., or 115-125° C.

The expandable thermoplastic microspheres may be provided in the form of an aqueous dispersion. The amount of expandable microspheres in the aqueous dispersion may be between 2 and 60% by weight based on the total weight of the aqueous dispersion, or between 5 and 40% by weight based on the total weight of the dispersion, or between 10 and 25% by weight based on the total weight of the dispersion.

The expandable microspheres may be combined with one or more fillers prior to mixing with the other components of the particulate composition. An aqueous dispersion of expandable microspheres may be treated with the particulate filler. If required, the filler may be pre-treated with a suitable modifying agent.

Acidic Catalyst

The acidic catalyst as used herein may be a strong inorganic or organic acid or their esters. Strong organic acids include sulphonic acids and their esters including benzene sulphonic acid, toluene sulphonic acid, phenol sulphonic acid, xylene sulphonic acid, β-naphthalene sulphonic acid, α-naphthalene sulphonic acid, esters thereof and mixtures thereof. The acids may further include weak inorganic acids and their esters, either alone or in admixture. The acids that may be employed still further include mixtures of two or more of strong organic acids; mixtures of two or more of esters of strong organic acids; mixtures of two or more of weak inorganic acids; or mixtures of two or more of esters of weak inorganic acids, as well as mixtures of different acids or their esters. Suitable catalysts are phosphate esters and blends of phosphoric acid with strong organic acids such as para-toluene sulphonic acid or any other sulphonic acid or its ester. Mixtures of any two or more of the acids and/or esters may also be used.

The particulate compositions prepared according to the processes disclosed herein comprise a reactive phenolic resole resin that may be cured and may be considered as precursor compositions to polystyrene-phenolic foam composites.

Accordingly, there is provided a process for preparing a polystyrene-phenolic foam composite comprising the steps of:
  a) forming a mixture of expandable thermoplastic microspheres, reactive phenolic resole resin and expandable polystyrene particles in the presence of an acidic catalyst;
  b) conditioning the mixture to partially cure the reactive phenolic resole resin; and
  c) further curing the conditioned mixture with steam to form the composite.

There is also provided a process for preparing a polystyrene-phenolic foam composite comprising the steps of:
a) forming a mixture of expandable thermoplastic microspheres and reactive phenolic resole resin in the presence of an acidic catalyst;
b) combining the mixture formed in a) with expandable polystyrene particles to form a mixture;
c) conditioning the mixture formed in b) to partially cure the reactive phenolic resole resin; and
d) further curing the conditioned mixture with steam to form the composite.

There is also provided a process for preparing a polystyrene-phenolic foam composite comprising the steps of:
a) forming a mixture of expandable thermoplastic microspheres, reactive phenolic resole resin and expandable polystyrene particles in the presence of an acidic catalyst;
b) conditioning the mixture to provide a water content of less than 10% by weight based on the total weight of the mixture and water; and
c) further curing the conditioned mixture with steam to form the composite.

There is also provided a process for preparing a polystyrene-phenolic foam composite comprising the steps of:
a) forming a mixture of expandable thermoplastic microspheres and reactive phenolic resole resin in the presence of an acidic catalyst;
b) combining the mixture formed in a) with expandable polystyrene particles to form a mixture;
c) conditioning the mixture formed in b) to provide a water content of less than 10% by weight based on the total weight of the conditioned mixture and water; and
d) further curing the conditioned mixture with steam to form the composite.

There is also provided a process for preparing a polystyrene-phenolic foam composite comprising the steps of:
a) forming a mixture of expandable thermoplastic microspheres and acidic catalyst;
b) combining the mixture formed in a) with reactive phenolic resole resin;
c) combining the mixture formed in b) with expandable polystyrene particles;
d) conditioning the mixture formed in c) to partially cure the reactive phenolic resole resin; and
e) further curing the conditioned mixture with steam to form the composite.

There is also provided a process for preparing a polystyrene-phenolic foam composite comprising the steps of:
a) forming a mixture of expandable thermoplastic microspheres and acidic catalyst;
b) combining the mixture formed in a) with reactive phenolic resole resin;
c) combining the mixture formed in b) with expandable polystyrene particles;
d) conditioning the mixture formed in c) to provide a water content of less than 10% by weight based on the total weight of the conditioned mixture and water; and
e) further curing the conditioned mixture with steam to form the composite.

Optionally, one or more fillers may be added at any one or more of steps a), b) or c). Optionally one or more additives such as surfactants or carbon, optionally in dispersed form, may be added at any one or more of steps a), b) or c).

The conditioned mixture according to any of the aforementioned embodiments may have a water content of less that 10% by weight based on the total weight of the composition and water, or a water content of less that 7% by weight based on the total weight of the composition and water, or a water content of less that 5% by weight based on the total weight of the composition and water, or a water content of less that 3% by weight based on the total weight of the composition and water.

In any of the herein disclosed curing processes, after conditioning the compositions may be held for a period of time from between 1 hour and 72 hours prior to curing, or from between 2 hours and 48 hours, or from between 4 hours and 48 hours. After conditioning the compositions may be held for any of these time periods at a temperature of no more than 30° C. or no more than 25° C. or no more than 20° C.

The polystyrene-phenolic foam composites produced from the processes disclosed herein may be characterised by having expanded polystyrene and/or the expanded thermoplastic microspheres, at least in part, solubilised in a cured phenolic resin.

Advantageously, the further curing step may be suitably performed in a steam block moulder which is typically utilised in the polystyrene industry for the manufacture of polystyrene blocks. This provides a significant cost advantage due to the very short processing times required. Therefore total batch cycle time may be reduced.

Further, energy savings of about 30% may be realised in comparison to preparing a traditional expanded polystyrene block in a steam block moulder.

The steam expansion process is also advantageous in comparison to compression moulding processes.

The further curing step may be performed in a sheet moulding machine so as to produce one or more sheets. The further curing step may also be performed in a continuous panel press to produce, for example, panels or sheets in a continuous fashion.

One or more steps of the processes disclosed herein may be performed in batch or continuous modes.

It is surprising that the phenolic resin, a condensation polymer, may be cured with steam, which intuitively may be considered to inhibit the reaction. However, without wishing to be bound by theory, the present disclosure demonstrates that, provided the phenolic resin is at least partially cured, further curing with steam may be effective.

The processes disclosed herein may utilise expandable polystyrene, thermoplastic microspheres, phenolic resole resin, fillers, treated fillers, and other components as hereinbefore disclosed.

The processes may utilise from 20 to 80 wt. % of expandable polystyrene particles, from 20 to 60 wt. % of reactive phenolic resole resin and from 0.5 to 5 wt. % of thermoplastic microspheres based on the total weight of these three components, or from 35 to 65 wt. % of expandable polystyrene particles, from 25 to 50 wt. % of reactive phenolic resole resin and from 1.5 to 5 wt. % of thermoplastic microspheres based on the total weight of these three components.

Conditioning and Curing Processes

Conditioning the mixture is a key feature of the processes. The conditioning may be performed at a temperature from between 5° C. and 80° C., or between 20° C. and 80° C., or between 50° C. and 70° C. The time for conditioning may be between 0.25 hr and 10 hr, or between 0.25 hr and 5 hr, or between 0.25 hr and 2 hr. Conditioning in this way effectively amounts to 'B staging', a term commonly used in the art to describe the removal of solvent, in this case water, from a resin, with only partial curing occurring. It is important that the mixture after conditioning is substantially touch dry, yet has only achieved a partial degree of cure. An important characteristic of the product after conditioning is that it is substantially flowable.

On curing the phenolic resole resin, which must be highly reactive as herein described, it may bind and/or solubilise the polystyrene particles and/or the thermoplastic microparticles, as well as any other beneficial functional additives present.

Suitable thermoplastic microspheres may begin to soften in the temperature range of 70-100° C., or 85-95° C. and maximum expansion may occur in the range of 100-150° C., or 115-125° C. However, in the presence of phenolic resole resin, the shells may be plasticised and partially solubilised so that expansion may begin in the range of 50-70° C., or 55-60° C.

When steam is introduced into the mixture the polystyrene particles soften and expand due to an increase in the blowing agent vapour pressure. Steam exposure may also soften the phenolic resin. The thermoplastic microspheres may also readily expand with heat when plasticised by the phenolic resin. The result of this may be to minimise the interstitial volume of the composite and to substantially fuse the polystyrene particles and phenolic foam together into a solid foam. An advantage of the processes disclosed herein is that the resulting composites may be produced quickly and efficiently using standard expanded polystyrene processing equipment. The steam curing step may take from 1 minute to 60 minutes, or from 1 minute to 30 minutes, or from 1 minute to 15 minutes. Advantageously, a combination of steam and vacuum may be used so as to control the pressure within the curing unit. The temperature of the steam may be in the range of 105 to 110° C.

A feature of curing is the mechanism by which the highly reactive phenolic resole resin may plasticise and interact physically and/or chemically with the thermoplastic shell of the microspheres and/or with the polystyrene. After processing, the phenolic resin may solubilise, and/or mix and/or cross-link with the thermoplastic homopolymer/copolymer and/or polystyrene and, as a result, a composite product may be formed whereby the phenolic resin modified microspheres and/or polystyrene become highly fire resistant and the phenolic foam so formed is no longer rigid and brittle but is, conversely, tough and resilient in nature.

Properties of the Foam Composites

A feature of the composites is the plasticisation and physical and/or chemical interaction of the cured phenolic resole resin with the thermoplastic shell of the microspheres and/or with the polystyrene particles. The phenolic resin may solubilise, and/or mix, and/or cross-link with the thermoplastic homopolymer/copolymer of the microspheres and/or polystyrene particles and, as a result, a composite product is formed. When the composite is exposed to a heat source it advantageously maintains its structural integrity.

The solubilisation and/or mixing and/or chemical interaction may account for, at least in part, the low interstitial volume and low water absorption of the foam composites.

Where physical interaction occurs this may be in the form of polymer entanglement which may form an interpenetrating polymer network.

The foam composites prepared by the processes disclosed herein may be semi-resilient and non-friable compared to other structural foams. Densities may be produced in the range 10-50 kg/m3, or 10-40 kg/m$^3$, or 10-30 kg/m$^3$ depending on formulation and additives. Despite the apparently flammable thermoplastic microsphere and polystyrene content, the foam composites are highly resistant to temperature and fire, likely due to the solubilisation of the polymer shell of the microspheres and/or the polystyrene by the phenolic resin. Desirable flame stability is also observed whereas conventional phenolic foams and resin are often subject to spalling/punking. The foam composites possess excellent physical and chemical properties. The cured phenolic resole resin is not rigid and brittle but is, conversely, tough and resilient in nature.

The foam composites prepared according to the processes disclosed herein may have a specific mass loss rate @ 50 kW, measured according to ISO 17554, of less than 8 g/m$^2$·s, or less than 6 g/m$^2$·s, or less than 4 g/m$^2$·s, or less than 2 g/m$^2$·s.

The foam composites prepared according to the processes disclosed herein may exhibit insulation failure times, according to AS1530.4, for a 100 mm thick panel, of greater than 30 minutes, or greater than 20 minutes, or greater than 10 minutes. The foam composites prepared by the processes disclosed herein advantageously may possess low interstitial volume. While not wishing to be bound by theory it is believed that during steam curing solubilisation of the polystyrene and/or thermoplastic microsphere phases in the phenolic phase occurs, and this accounts, at least in part, for the low interstitial volume. The interstitial volume may be 5% or less, or 3% or less, or 1% or less, or 0.5% or less, or 0.3% or less.

The foam composites prepared by the disclosed processes advantageously may possess low water absorption in accordance with ASTM C272 (Standard Test Method for Water Absorption of Core Materials for Sandwich Constructions). The water absorption of the foam composites may be 8% by volume or less, or 7% by volume or less, or 5% by volume or less, or between 4 and 8% by volume, or between 5 and 7% by volume.

There is also provided a foam composite prepared according to any one or the processes as herein disclosed.

There is also provided a composite block comprising the foam composite prepared according to any one of the processes as herein disclosed.

There is also provided a panel or a sheet comprising the foam composite prepared according to any one of the processes as herein disclosed.

The blocks, panels and/or sheets find advantageous use in applications requiring thermal and/or acoustic insulation, for example, in construction.

There is also provided a construction material comprising the blocks, panels and/or sheets as hereinbefore disclosed.

Throughout this specification, use of the terms "comprises" or "comprising" or grammatical variations thereon shall be taken to specify the presence of stated features, integers, steps or components but does not preclude the presence or addition of one or more other features, integers, steps, components or groups thereof not specifically mentioned.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

DETAILED DESCRIPTION

It will now be convenient to describe the disclosure with reference to particular embodiments and examples. These embodiments and examples are illustrative only and should not be construed as limiting upon the scope of the disclosure. It will be understood that variations upon the described disclosure as would be apparent to the skilled addressee are within the scope of the disclosure. Similarly, the present disclosure is capable of finding application in areas that are not explicitly recited in this document and the fact that some applications are not specifically described should not be considered as a limitation on the overall applicability of the disclosure.

Thermoplastic Microspheres

When thermoplastic microspheres are heated, the polymeric shell gradually softens, and the liquid within the shell begins to gasify and expand. When the heat is removed, the shell stiffens and the microsphere remains in its expanded form. When fully expanded, the volume of the microspheres may increase more than 40 times. Significant density reductions can be achieved with even a small concentration of, for example, 3% thermoplastic microspheres by weight. A benefit of the hollow microsphere is the potential to reduce part weight, which is a function of density. Compared to traditional mineral-based additives, such as calcium carbonate, gypsum, mica, silica and talc, hollow microspheres have much lower densities. Loadings may be 1-5% by weight, which can equate to 25% or more by volume.

The expandable thermoplastic microspheres suitable for preparing the particulate compositions and foam composites as disclosed herein may be utilised in various forms. They may be in the form of a slurry dispersed in water or they may be utilised in dry form. Aqueous dispersions are preferred. Suitable microspheres are supplied by AkzoNobel under the trade mark Expancel®.

Reactive Phenolic Resole Resin

A reactive phenolic resole resin suitable for further curing, that is, to form a partially cured ('B staged') or substantially completely cured resin, may be produced by the base-catalysed condensation reaction of a molar excess of an aldehyde, with a substituted or unsubstituted phenol. Preferred substituted phenols are those in which the substituent does not impede the condensation of the phenol(s) with the aldehyde(s). Suitable substituents include halogens or a hydroxy, alkyl or an aryl group. Unsubstituted phenol is most preferred. Suitable aldehydes are formaldehyde (including oligomers/polymers such as trioxane), furfural, sugars and cellulose hydrolysates. A preferred aldehyde is formaldehyde. In one embodiment the molar ratio of aldehyde to phenol is from 1.4 to 1.8:1, for example, about 1.6:1. The temperature at which the phenolic resole resin is prepared may be less than 65° C., for example no more than 60° C.±2° C., or no more than about 60° C. This temperature of less than 65° C. is preferably maintained while the basic catalyst is active, that is, until the basic catalyst is neutralised. This temperature may allow the maximum substitution of the phenol aromatic ring by reactive methylol (—CH$_2$OH) groups and results in only low molecular weight development in the polymer. Water may then be optionally distilled off to the preferred specification. Due to the resulting low molecular weight (preferably less than 1000 Daltons), the phenolic resole resin is highly soluble in water without phase separation and remains sufficiently reactive to cross-link under dilute aqueous conditions.

Suitable alkaline condensation catalysts are ammonia, ammonium hydroxide, sodium hydroxide, potassium hydroxide and barium hydroxide. Sodium hydroxide is a preferred catalyst.

The phenolic resole resin may be produced from phenol with a molar excess of formaldehyde in the presence of sodium hydroxide as a condensation catalyst.

Conventional phenolic resins may be produced by carefully increasing the temperature to around 60±2° C. and holding there for a period of about 1 hour, after which the temperature is increased to around 80° C. for a further period of 2-4 hours. The two stages essentially are:

1. Ring Substitution at 60° C. by formaldehyde into the phenol aromatic ring; and
2. Condensation Polymerisation at 80° C. to increase molecular weight.

In contrast, the reactive phenolic resole resin as used herein may be obtained, for example, by only heating to no more than 65° C., for example, no more than 60±2° C. or no more than about 60° C. for a period of about 5 hours or until an intermediate viscosity of 13.5-14.5 centiStokes at 25° C. is reached for the reaction mixture. This leads to maximum substitution by methylol (—CH$_2$OH) groups in ortho-, meta- and para-positions of the aromatic ring and only low molecular weight build. The mixture may then be neutralised with an acid such as para-toluene sulphonic acid to a pH of less than 7, or between 5.5-6.6, or about 6 and most of the process and reaction water may then be distilled off under vacuum down to a level of around 2-7%, resulting in a highly reactive material.

Fillers

The particulate composition and/or the phenolic composites may comprise one or more fillers. Suitable, non limiting fillers include inorganic compounds, particularly particulate inorganic compounds.

Exemplary fillers include elemental metal selected from the group consisting of metals of Groups I, II, III and IV, transition metals or the like of the periodic table, oxides or complex oxides of these metals, salts of these metals, such as fluorides, carbonates, sulfates, silicates, hydroxides, chlorides, sulfites, and phosphates of these metals, and composites of these salts of metals. Preferably used are metal oxides such as amorphous silica, quartz, alumina, titania, zirconia, barium oxide, yttrium oxide, lanthanum oxide, and ytterbium oxide, silica-based complex oxides such as silica-zirconia, silica-titania, silica-titania-barium oxide, and silica-titania-zirconia, glass such as borosilicate glass, glass fibres, aluminosilicate glass, or fluoroaluminosilicate glass, metal fluorides such as barium fluoride, strontium fluoride, yttrium fluoride, lanthanum fluoride, and ytterbium fluoride; inorganic carbonates such as calcium carbonate, magnesium carbonate, strontium carbonate, and barium carbonate; and metal sulfates such as magnesium sulfate and barium sulfate. Other suitable fillers include particulate silica, talc, kaolin, clay, nanocomposites and nanoparticles. Other inorganic compounds such as boric acid may be utilised as a filler.

The filler may be present in amounts of 0.5-60% by weight, or 1-20% by weight or 2-15% by weight, based on the total weight of the particulate composition or composite.

The filler may have a particle size between 0.1 mm and 5 mm, or between 0.5 mm and 2 mm. One preferred particulate filler is granular boric acid. Granular boric acids of particle size of about 1 mm may be suitable.

Modified Fillers

Often it is advantageous to treat fillers with a modifying agent so as to modify the surface properties of the filler. For example fillers may be modified with agents so as to change the fillers solubility properties. Suitable modifiying agents are well known in the art. One class of modifying agents are silanes. One class of silanes are haloalkylsilanes examples of which are 3-chloropropyltrimethoxysilane, 3-chloropropyltriethoxysilane, 3-chloropropyltripropoxysilane, chloropropylmethyldimethoxysilane, chloropropylmethyldiethoxysilane, chloropropyldimethylethoxysilane, chloropropyldimethylmethoxysilane, chloroethyltrimethoxysilane, chloroethyltriethoxy-silane, chloroethylmethyldimethoxysilane, chloroethylmethyldiethoxysilane, chloroethyldimethylmethoxysilane, chloroethyldimethylethoxysilane, chloromethyltriethoxy-silane, chloromethyltrimethoxysilane, chloromethylmethyldimethoxysilane, chloromethylmethyldiethoxysilane, chloro-methyldimethylmethoxysilane or chloromethyldimethylethoxysilane.

Granular boric acid may be treated with one or more of the above silanes so as to reduce the solubility of the boric acid in water.

Materials and Process

In an exemplary embodiment a preblend of the following components as described herein may be prepared. After combining the components the preblend may be stored for future use. The specific gravity of the mixture may be in the range 1.4 to 1.7. Continuous slow agitation during the manufacturing process may be utilised.

| Preblend | %.w/w |
| --- | --- |
| Expandable thermoplastic microspheres | 9.3% |
| Boric acid | 56.0% |
| Carbon dispersion | 15.6% |
| Surfactant | 0.4% |
| Acidic catalyst | 18.7% |

The preblend may be combined with reactive phenolic resole to form a reactive liquid matrix in the exemplary proportions shown below. This liquid matrix may have a shelf life of between 4 and 10 minutes at about 20° C. after which time exothermic cross linking may occur. The rate of cross linking is temperature dependent.

| Liquid matrix | %-w/w |
| --- | --- |
| Reactive phenolic resole | 76% |
| Preblend | 24% |

The liquid matrix may be used to coat partially expanded polystyrene particles in the exemplary proportions (and exemplary ranges) shown below.

| Foam composite | %.w/w |
| --- | --- |
| Partially expanded polystyrene | 45% (25% to 65%) |
| Liquid Matrix | 55% (35% to 70%) |

Coating

Coating may be performed in a batch mixer such as a ribbon type mixer. The components may also be blended in a continuous process by preparing the liquid matrix immediately prior to coating partially expanded polystyrene particles.

A stream of partially expanded polystyrene particles may be introduced into, for example, a rotating drum beneath liquid matrix feed streams such that the liquid matrix is drizzled over the surface of the moving partially expanded polystyrene particles. Rotation of the drum may facilitate even distribution of the matrix evenly over the surfaces of the partially expanded polystyrene particles.

The absence of any form of strakes or mixing impellors in the rotating drum may advantageously eliminate the matrix coming into contact with other surfaces, and potential adherence to parts of the mixer.

Conditioning (B-Staging) to Form Particulate Composition

Conditioning may conveniently be performed in, for example, a rotating drum. Air heated to between, for example, 45° C. and 60° C. may be passed through the drum and the coating material may progressively lose free water and may initiate cross linking and bond development between the partially expanded polystyrene and the matrix.

During the conditioning process the product characteristic may change from a wet free flowing high viscosity fluid to a sticky plastic, and finally to discrete clumps of lightly adhering mixture.

Coated product exiting the drum may drop on to a mesh conveyor belt or tray. The belt may be fully enclosed in a heated chamber with suitable means of passing air heated to between, for example, 45° C. and 60° C. over the coated product. The size and speed of the belt or tray may be such that the coated product remains as an undisturbed 100 mm thick layer for about 45 mins duration.

Discharge off the belt into a grizzly feeder or combination of granulator and sizing mesh may be required to break down the aggregated material into discrete coated grains ready for conveying into storage prior to composite formation.

Composite Formation

Clamshell style vacuum assisted expanded polystyrene block moulding equipment may be suitable for processing the coated product into blocks. Coated product may be allowed to come to equilibrium in a fully vented storage space where the temperature preferably does not exceed 20° C. for between 4 hrs and 48 hrs from coating. Air transport may be used to convey material to standard block moulder filling guns via a de-dusting station to remove any fines generated during the coated product handling processes.

A standard expandable polystyrene block making cycle may be employed with maximum steam pressure being for example about 2 bar and utilising gentle cross steaming with vacuum assistance. Polishing of mould surfaces may be utilised so as to minimise mechanical keying of the matrix to the mould surface thereby facilitating clean ejection of the finished block.

Fire Resistance Testing

Fire resistance may be tested in terms of integrity and insulation.

Integrity

Integrity may be defined as the ability of an element of construction to resist the passage of flames and hot gases from one space to another when tested in accordance with AS1530.4. Failure for integrity criteria is deemed to occur when continuous flaming occurs on the non-exposed side of the test specimen, or when cracks, fissures and other openings through which hot flames and gases can pass through are present.

Insulation

Insulation may be defined as the ability of an element of construction to maintain a temperature on the surface that is not exposed to a heat source, below the limits specified, when tested in accordance with Australian Standard AS1530.4 (Fire Resistance Test to Building Material). Failure for insulation criteria is deemed to have occurred when the temperature rise of the non exposed side exceeds predetermined thresholds.

Panels manufactured from composites prepared according to the present disclosure achieve 30 mins insulation for 100 mm thick panels when tested according to AS1530.4.

EXAMPLES

The following example utilised the components as set out in Table 1. The weights of the thermoplastic microspheres and the carbon dispersion include water present in the materials.

Example 1

TABLE 1

| Material | % w/w |
| --- | --- |
| Expanded polystyrene (Lambdapor 753p) | 69.7 |
| Phenolic resole resin | 23.2 |
| Thermoplastic microspheres (Expancel ® 820 SLU40) | 1.74 |
| Treated boric acid | 3.48 |
| Aqueous carbon dispersion | 0.46 |
| Catalyst (p-toluene sulphonic acid) | 1.39 |

Preparation of Microsphere Composition

Particulate boric acid was treated with 3-chloropropyltrimethoxysilane followed by heating the mixture to 70° C. for 30 mins.

A microsphere composition comprising expandable thermoplastic microspheres, coated boric acid, carbon dispersion and catalyst was prepared by mixing the components in a plough-share mixer for 5 mins. The resultant blend was then sieved through a vacuum assisted Buchner funnel fitted with 1 mm aperture square mesh.

Preparation of the Particulate Composition

Polystyrene was expanded to a density of 18 kg/m$^3$ and retained in a silo for 11 hrs. The partially expanded polystyrene was fed into a mixing head at a rate of 68 litres/min. The phenolic resole resin was pumped into the mixing head at a rate of 0.68 kg/min. The microsphere composition was pumped into the mixing head at a rate of 0.208 kg/m in.

A multi stream nozzle fed a curtain of phenolic resin and microsphere composition over the moving polystyrene particles in a mixer at a temperature between 15° C. and 30° C.

After approximately 3 minutes the resultant mixture was fed into a second rotating drum with a hot air curtain blowing over the mix. The air temperature was maintained between 50° C. and 75° C. with a transit time of 10 mins.

The discharge was transferred to a fluid bed and held at 35° C. for up to 45 minutes. This material was then fed via air transport to a cloth silo, where it was held for 24 hours.

Preparation of Polystyrene/Phenolic Composite

The material was then removed from the silo by suction and blown into a block moulder silo and drained down to fill a block mould. Once the mould was filled, a steam cycle was commenced which yielded the completed composite within 10 mins.

Example 2

Preparation of Microsphere Composition

Particulate boric acid was treated with 3-chloropropyltrimethoxysilane followed by heating the mixture to 70° C. for 30 mins.

A microsphere composition comprising expandable thermoplastic microspheres, coated boric acid, and carbon dispersion was prepared by mixing the components in a plough-share mixer for 5 mins. The resultant blend was then sieved through a vacuum assisted Buchner funnel fitted with 1 mm aperture square mesh.

Preparation of the Particulate Composition

Polystyrene was expanded to a density of 18 kg/m$^3$ and retained in a silo for 11 hrs. The partially expanded polystyrene was fed into a mixing head at a rate of 68 litres/min. The phenolic resole resin was pumped into the mixing head at a rate of 0.68 kg/min. The microsphere composition was pumped into the mixing head at a rate of 0.167 kg/min.

A multi stream nozzle fed a curtain of phenolic resin and microsphere composition over the moving polystyrene particles in a mixer at a temperature between 15° C. and 30° C. Catalyst was added to the mixture at the mixer discharge at a rate of 0.0488 kg/min.

After approximately 3 minutes the resultant mixture was fed into a second rotating drum with a hot air curtain blowing over the mix. The air temperature was maintained between 50° C. and 75° C. with a transit time of 10 mins.

The discharge was transferred to a fluid bed and held at 35° C. for up to 45 minutes. This material was then fed via air transport to a cloth silo, where it was held for 24 hours.

Preparation of Polystyrene/Phenolic Composite

The material was then removed from the silo by suction and blown into a block moulder silo and drained down to fill a block mould. Once the mould was filled, a steam cycle was commenced which yielded the completed composite within 10 mins.

In an alternate experiment the material from the silo was used to fill multiple sheet moulds and the moulds were subsequently steamed for 10 mins to produce completed sheets.

Example 3

Preparation of Microsphere Composition

Particulate boric acid was treated with 3-chloropropyltrimethoxysilane followed by heating the mixture to 70° C. for 30 mins. The material was sieved and the fraction retained on BS#10 mesh discarded.

A microsphere composition comprising expandable thermoplastic microspheres, carbon dispersion and catalyst was prepared by mixing the components in a plough-share mixer for 5 mins.

Preparation of the Particulate Composition

Polystyrene was expanded to a density of 18 kg/m$^3$ and retained in a silo for 11 hrs. The partially expanded polystyrene was fed into a mixing head at a rate of 68 litres/min. The phenolic resole resin was pumped into the mixing head at a rate of 0.68 kg/min. The microsphere composition was pumped into the mixing head at a rate of 0.105 kg/min. The treated boric acid was fed into the mixing head at a rate of 0.102 kg/min.

A multi stream nozzle fed a curtain of phenolic resin and microsphere composition over the moving polystyrene particles in a mixer at a temperature between 15° C. and 30° C.

After approximately 3 minutes the resultant mixture was fed into a second rotating drum with a hot air curtain blowing over the mix. The air temperature was maintained between 50° C. and 75° C. with a transit time of 10 mins.

The discharge was transferred to a fluid bed and held at 35° C. for up to 45 minutes. This material was then fed via air transport to a cloth silo, where it was held for 24 hours.

Preparation of Polystyrene/Phenolic Composite

The material was then removed from the silo by suction and blown into a block moulder silo and drained down to fill a block mould. Once the mould was filled, a steam cycle was commenced which yielded the completed composite within 10 mins.

In an alternate experiment the material from the silo was used to fill multiple sheet moulds and the moulds were subsequently steamed for 10 mins to produce completed sheets.

Example 4

Preparation of Microsphere Composition

Particulate boric acid was treated with 3-chloropropyltrimethoxysilane followed by heating the mixture to 70° C. for 30 mins. The material was sieved and the fraction retained on BS#10 mesh discarded.

A microsphere composition comprising expandable thermoplastic microspheres, carbon dispersion and catalyst was prepared by mixing the components in a plough-share mixer for 5 mins.

Preparation of the Particulate Composition

Polystyrene was expanded to a density of 18 kg/m$^3$ and retained in a silo for 11 hrs. The partially expanded polystyrene was fed into a mixing head at a rate of 68 litres/min. The phenolic resole resin was pumped into the mixing head at a rate of 0.68 kg/min. The microsphere composition was pumped into the mixing head at a rate of 0.105 kg/min. The treated boric acid was fed into the mixing head at a rate of 0.102 kg/min.

A multi stream nozzle fed a curtain of phenolic resin and microsphere composition over the moving polystyrene particles in a mixer at a temperature between 15° C. and 30° C.

After approximately 3 minutes the resultant mixture was fed into a second rotating drum with a hot air curtain blowing over the mix. The air temperature was maintained between 50° C. and 75° C. with a transit time of 10 mins.

The discharge was transferred to a fluid bed and held at 35° C. for up to 45 minutes. This material was then fed via air transport to a cloth silo, where it was held for 24 hours.

Preparation of Polystyrene/Phenolic Composite

The material was then removed from the silo by suction and blown into a continuous tractor type moving belt panel press with our without using facing steel sheets on two faces. The material in the press was steamed as it progressed through the press to form completed sheets or completed insulated panel sith steel, aluminium or other material facings. The continuous press was moving a between 1 and 15 metres/min.

Table 2 indicates the formulations of other composites prepared in a similar manner to Example 1 above.

TABLE 2

| Run no. | 1 | 2 | 3 | 4 | 5 | 6 | 7 |
|---|---|---|---|---|---|---|---|
| Expanded Polystyrene % (w/w) | 38.7 | 52.5 | 64.8 | 58.4 | 52.3 | 53.5 | 52.6 |
| Phenolic Resin % (w/w) | 47.0 | 36.4 | 27.0 | 31.9 | 35.8 | 36.6 | 36.0 |
| Thermoplastic Microspheres % (w/w) | 3.5 | 2.7 | 2.0 | 2.4 | 3.6 | 1.5 | 2.7 |
| Treated Boric Acid % (w/w) | 7.0 | 5.5 | 4.0 | 4.8 | 5.4 | 5.5 | 5.4 |

TABLE 2-continued

| Run no. | 1 | 2 | 3 | 4 | 5 | 6 | 7 |
|---|---|---|---|---|---|---|---|
| Carbon Dispersion % (w/w) | 0.9 | 0.7 | 0.5 | 0.6 | 0.7 | 0.7 | 0.7 |
| Catalyst % (w/w) | 2.8 | 2.2 | 1.6 | 1.9 | 2.2 | 2.2 | 2.2 |

It was found that all of the composites had excellent physical properties (low interstitial volume and low water absorption) demonstrating advantage over a wide range of relative component amounts. The mechanical properties of the composites were equivalent to expanded polystyrene.

Fire Resistance Testing

Test specimens consisted of insulated wall panels comprising foam composites as prepared by the processes disclosed herein. The panels were 3.0 m high, 1.2 m or 0.6 m broad and had a thickness of 50 mm, 100 mm and 250 mm. A comparative test was performed with a 125 mm thick expanded polystyrene panel. Tests were conducted in accordance with AS 1530.4 'Methods for fire tests on building materials, components and structures, Part 4: Fire resistance tests of elements of construction, Section 3 Walls—Vertical Separating Elements'. The results are collected in Table 3.

TABLE 3

| Material and thickness | Insulation failure time (minutes) |
|---|---|
| Inventive composite 50 mm | 15 |
| Inventive composite 100 mm | 31 |
| Inventive composite 250 mm | 115 |
| Comparative Polystyrene 125 mm | 6 |

It is clear from the results that the composites prepared by the processes disclosed herein significantly outperform expanded polystyrene in fire resistance.

Tests were also conducted following ISO 17554. This is a small-scale method for assessing the mass loss rate of essentially flat specimens exposed in the horizontal orientation to controlled levels of radiant heating with an external igniter under well-ventilated conditions. The mass loss rate is determined by measurement of the specimen mass and is derived numerically. Mass loss rate can be used as an indirect measure of heat release rate.

Under the conditions of the test expanded polystyrene had an average specific mass loss rate @ 50 kW, over three tests, of 9.81 g/m$^2$·s, whereas composites prepared by the processes disclosed herein had an average specific mass loss rate @ 50 kW, over three tests, of 1.27 g/m$^2$·s. Accordingly, significantly slower combustion was observed with the inventive composites.

The claims defining the invention are as follows:

1. A process for preparing a polystyrene foam composite comprising the steps of:
   a) forming a mixture of expandable thermoplastic microspheres, reactive phenolic resole resin and expandable polystyrene particles in the presence of an acidic catalyst;
   b) conditioning the mixture to partially cure the reactive phenolic resole resin; and
   c) further curing the conditioned mixture by contacting with steam to form the composite.

2. A process according to claim 1 comprising the steps of:
a) forming a mixture of expandable thermoplastic microspheres and reactive phenolic resole resin in the presence of an acidic catalyst;
b) combining the mixture formed in a) with expandable polystyrene particles to form a mixture;
c) conditioning the mixture formed in b) to partially cure the reactive phenolic resole resin; and
d) further curing the conditioned mixture by contacting with steam to form the composite.

3. A process according to claim 1 wherein the conditioning is performed at a temperature from between 50° C. and 75° C.

4. A process according to claim 1 wherein the conditioning is performed from between 0.25 and 10 hr.

5. A process according to claim 1 wherein the conditioned mixture is held for between 4 and 48 hours prior to further curing.

6. A process according to claim 1 wherein the further curing takes from between 1 minute and 60 minutes.

7. A process according to claim 1 wherein the expandable polystyrene particles are partially expanded.

8. A process according to claim 1 wherein the density of the expandable polystyrene particles is between 5 kg/m$^3$ and 20 kg/m$^3$.

9. A process according to claim 1 further comprising the step of adding one or more fillers.

10. A process according to claim 9 wherein the filler is added in an amount of 0.5-60% by weight based on the total weight of the composition.

11. A process according to claim 9 wherein the filler is a surface treated filler.

12. A process according to claim 1 wherein the reactive phenolic resole resin has one or more of the following properties:
(a) a viscosity between 500 and 4,000 cP;
(b) a water content between 2 and 7% by weight;
(c) a free phenol content less than 25%; or
(d) a free formaldehyde content of less than 3%.

13. A process according to claim 1 wherein the expandable thermoplastic microspheres have an average particle size from between 1 and 50 microns and wherein the expandable microspheres contain a propellant encapsulated within a thermoplastic polymer shell.

14. A process according to claim 1 wherein the thermoplastic polymer shell is derived from monomers selected from the group consisting of acrylonitrile, methacrylonitrile, α-chloroacrylonitrile, α-ethoxyacrylonitrile, fumaroacrylonitrile, crotoacrylonitrile, acrylic esters, methacrylic esters, vinyl chloride, vinylidene dichloride, vinyl pyridine, vinyl esters, and derivatives or mixtures thereof.

15. A process according to claim 1 wherein the acidic catalyst is selected from a strong organic acid, an ester of a strong organic acid, a weak inorganic acid, an ester of a weak inorganic acid or mixtures thereof.

16. A process according to claim 1 wherein the further curing is performed in a steam block moulder, a sheet moulder or a continuous panel press.

* * * * *